US012621330B2

(12) United States Patent
Rout et al.

(10) Patent No.: US 12,621,330 B2
(45) Date of Patent: May 5, 2026

(54) SYSTEMS AND METHODS FOR AUTOMATED FILTER RECOMMENDATION FOR SIGMA RULES

(71) Applicant: Morgan Stanley Services Group Inc., New York, NY (US)

(72) Inventors: Swapna Sourav Rout, Karnataka (IN); Aman Gupta, Madhya Pradesh (IN); Ravi Kumar Raju Gottumukkala, Karnataka (IN); Greg Croxford, Baldwin, MD (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/769,716

(22) Filed: Jul. 11, 2024

(65) Prior Publication Data

US 2026/0019434 A1 Jan. 15, 2026

(51) Int. Cl.
*H04L 29/06* (2006.01)
*H04L 9/40* (2022.01)

(52) U.S. Cl.
CPC ................................ *H04L 63/1425* (2013.01)

(58) Field of Classification Search
CPC .................................................. H04L 63/1425
See application file for complete search history.

(56) References Cited

U.S. PATENT DOCUMENTS

| | | | |
|---|---|---|---|
| 11,218,498 B2 | 1/2022 | Hajimirsadeghi et al. | |
| 11,451,565 B2 | 9/2022 | Zhou et al. | |
| 2014/0053261 A1* | 2/2014 | Gupta | H04L 63/1425 |
| | | | 717/171 |
| 2021/0084073 A1 | 3/2021 | Crabtree et al. | |
| 2021/0185057 A1 | 6/2021 | McLean | |
| 2021/0266339 A1 | 8/2021 | Moshitzky et al. | |
| 2021/0273970 A1 | 9/2021 | Alshech et al. | |
| 2022/0329616 A1 | 10/2022 | O'Hearn et al. | |
| 2023/0113332 A1 | 4/2023 | Crabtree et al. | |
| 2023/0396637 A1 | 12/2023 | Hebbagodi et al. | |
| 2024/0289201 A1* | 8/2024 | Nagar | G06F 11/0751 |
| 2025/0141896 A1* | 5/2025 | Thomas | H04L 63/1416 |
| 2025/0274367 A1* | 8/2025 | Ananthanarayanan | |
| | | | H04L 43/0823 |

OTHER PUBLICATIONS

Shah, Syed Ali Raza, and Biju Issac. "Performance comparison of intrusion detection systems and application of machine learning to Snort system." Future Generation Computer Systems 80 (2018): 157-170. (Year: 2018).*

(Continued)

*Primary Examiner* — Ka Shan Choy

(74) *Attorney, Agent, or Firm* — PEARL COHEN ZEDEK LATZER BARATZ LLP

(57) ABSTRACT

System and method for automated filter determination of Sigma rules used in a malicious content detection system is provided. The system and method can include training a machine learning algorithm based on candidate sets that can be determined based on a plurality of sigma rules, and performing inference for a plurality candidate sets corresponding to a plurality of sigma rules based on the machine learning algorithm to detect malicious content.

16 Claims, 5 Drawing Sheets

(56)                    References Cited

OTHER PUBLICATIONS

SigmaHQ/Sigma, Fukusuket and Nasbench, 2023, posh_pc_
downgrade_attack.yml: https://github.com/SigmaHQ/sigma/blob/
master/rules/windows/powershell/powershell_classic/posh_pc_
downgrade_attack.vml. Downloaded Jul. 10, 2024.
SigmaHQ/Sigma, Fukusuket and Nasbench, 2023, posh_pc_renamed_
powershell.yml: https://github.com/SigmaHQ/sigma/blob/master/
rules/windows/powershell/powershell_classic/posh_pc_renamed_
powershell.vml Downloaded Jul. 10, 2024.

* cited by examiner

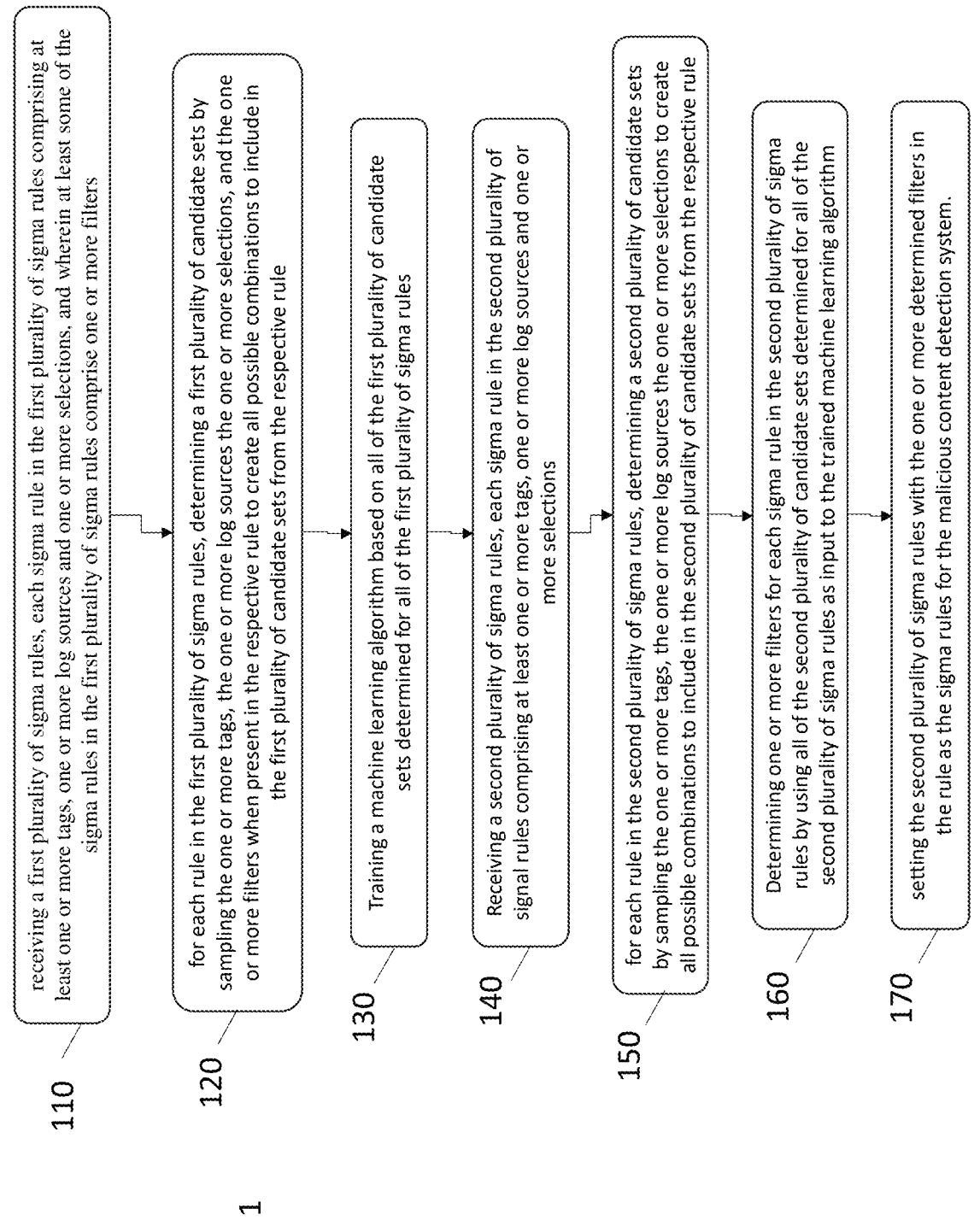

FIG. 1

110　receiving a first plurality of sigma rules, each sigma rule in the first plurality of sigma rules comprising at least one or more tags, one or more log sources and one or more selections, and wherein at least some of the sigma rules in the first plurality of sigma rules comprise one or more filters 120　for each rule in the first plurality of sigma rules, determining a first plurality of candidate sets by sampling the one or more tags, the one or more log sources the one or more selections, and the one or more filters when present in the respective rule to create all possible combinations to include in the first plurality of candidate sets from the respective rule 130　Training a machine learning algorithm based on all of the first plurality of candidate sets determined for all of the first plurality of sigma rules 140　Receiving a second plurality of sigma rules, each sigma rule in the second plurality of signal rules comprising at least one or more tags, one or more log sources and one or more selections 150　for each rule in the second plurality of sigma rules, determining a second plurality of candidate sets by sampling the one or more tags, the one or more log sources the one or more selections to create all possible combinations to include in the second plurality of candidate sets from the respective rule 160　Determining one or more filters for each sigma rule in the second plurality of sigma rules by using all of the second plurality of candidate sets determined for all of the second plurality of sigma rules as input to the trained machine learning algorithm 170　setting the second plurality of sigma rules with the one or more determined filters in the rule as the sigma rules for the malicious content detection system.

SYSTEMS AND METHODS FOR AUTOMATED FILTER RECOMMENDATION FOR SIGMA RULES

FIELD OF THE INVENTION

The invention relates generally systems and methods for tracking malicious activity in computing systems receiving messages using sigma rules. In particular, to systems and methods that automatically determine a filter for sigma rules for a malicious content detection system.

BACKGROUND

Currently, sigma rules can be used to detect malicious content for all communication coming into any system that employs sigma rules. Sigma rules are open source and written in a YAML format.

In current systems, sigma rules are written by a system's admin and/or adapted from open source databases of available sigma rules. When malicious content is identified by the sigma rules from incoming communication, it can be logged by the system, in some instances causing very large logs (e.g., on the order of Terabytes). In some scenarios, the sigma rules can erroneously identify communication as malicious. Typically, the logs are manually reviewed (e.g., by a system administrator) to determine whether any of the communication that was identified as malicious was erroneously identified. For any communication that was erroneously identified as malicious, the sigma rules can be manually updated to include a filter.

Manual malicious content review in logs and/or sigma rule updating is typically done weekly, bi-weekly or monthly. Difficulties can include human error, large amount of time and/or cost/resource spent. Therefore, it can be desirable to identify communication falsely identified as malicious in logs and/or update sigma rules automatically.

SUMMARY OF THE INVENTION

Advantages of the invention can include reducing an amount of time, cost and/or resource required to identify communication falsely identified as malicious in logs. Advantages of the invention can also include updating sigma rule filters automatically. Advantages of the invention can also include reducing a number of duplicate sigma rules. Advantages of the invention can also include increased accuracy, due to, for example, an ability to process thousands of sigma rules at a time to update filters, which can also be done in real-time or near real-time, providing the most accurate up to date filters.

In one aspect, the invention involves a computerized method for automated filter determination for Sigma rules used in a malicious content detection system. The method involves receiving, by a computing device, a first plurality of sigma rules, each sigma rule in the first plurality of signal rules comprising at least one or more tags, one or more log sources and one or more selections, and wherein at least some of the sigma rules in the first plurality of sigma rules comprise one or more filters. The method involves for each rule in the first plurality of sigma rules, determining, by the computing device, a first plurality of candidate sets by sampling the one or more tags, the one or more log sources the one or more selections, and the one or more filters when present in the respective rule to create all possible combinations to include in the first plurality of candidate sets from the respective rule. The method involves training, by the computing device, a machine learning algorithm based on all of the first plurality of candidate sets determined for all of the first plurality of sigma rules. The method involves receiving, by the computing device, a second plurality of sigma rules, each sigma rule in the second plurality of signal rules comprising at least one or more tags, one or more log sources and one or more selections. The method involves for each rule in the second plurality of sigma rules, determining, by the computing device, a second plurality of candidate sets by sampling the one or more tags, the one or more log sources, and the one or more selections to create all possible combinations to include in the second plurality of candidate sets from the respective rule. The method involves determining, by the computing device, one or more filters for each sigma rule in the second plurality of sigma rules by using all of the second plurality of candidate sets determined for all of the second plurality of sigma rules as input to the trained machine learning algorithm. The method involves setting, by the computing device, the second plurality of sigma rules with the one or more determined filters in the rule as the sigma rules for the malicious content detection system.

In some embodiments, the method involves determining, by the computing device, a similarity score between each unique pair of candidate sets in the second plurality of candidate sets and for each unique pair having a similarity score greater than a predetermined threshold, excluding one of the candidate sets in the unique pair.

In some embodiments, each candidate set in the first plurality of candidate sets has an order that causes the one or more filters present in any candidate set to be placed last. In some embodiments, the one or more tags, the one or more log sources, the one or more selections, and the one or more filters in the first candidate set are in any order.

In some embodiments, preprocessing, by the computing device, the first plurality of sigma rules into a normalized form. In some embodiments, the machine learning algorithm is a TRIE algorithm or recurrent neural network. In some embodiments, the second plurality of candidate sets is input to training the machine learning algorithm.

In some embodiments, one or more rules in the first plurality of sigma rules further comprises a condition, and wherein creating all possible combinations to include in the first plurality of candidate sets from the respective one or more rules further comprises creating a candidate set for each operator in a Boolean conditional statement in the respective condition, applying some filters according to the condition, or any combination thereof.

In another aspect, the invention includes one or more non-transitory computer-readable storage media comprising instructions that are executable to cause one or more processors to receive a first plurality of sigma rules, each sigma rule in the first plurality of signal rules comprising at least one or more tags, one or more log sources and one or more selections, and wherein at least some of the sigma rules in the first plurality of sigma rules comprise one or more filters and for each rule in the first plurality of sigma rules, determine a first plurality of candidate sets by sampling the one or more tags, the one or more log sources the one or more selections, and the one or more filters when present in the respective rule to create all possible combinations to include in the first plurality of candidate sets from the respective rule. The one or more non-transitory computer-readable storage media can also comprise instructions that are executable to cause one or more processors to train a machine learning algorithm based on all of the first plurality of candidate sets determined for all of the first plurality of sigma rules, receive a second plurality of sigma rules, each sigma rule in the second plurality of signal rules comprising at least one or more tags, one or more log sources and one or more selections, and for each rule in the second plurality of sigma rules, determine a second plurality of candidate sets by sampling the one or more tags, the one or more log sources and the one or more selections to create all possible combinations to include in the second plurality of candidate sets from the respective rule. The one or more non-transitory computer-readable storage media can also comprise instructions that are executable to cause one or more processors to determine one or more filters for each sigma rule in the second plurality of sigma rules by using all of the second plurality of candidate sets determined for all of the second plurality of sigma rules as input to the trained machine learning algorithm and set the second plurality of sigma rules with the one or more determined filters in the rule as the sigma rules for the malicious content detection system.

In some embodiments, the one or more non-transitory computer-readable storage media comprising instructions when executed further cause the one or more processors to determine a similarity score between each unique pair of candidate sets in the second plurality of candidate sets and for each unique pair having a similarity score greater than a predetermined threshold, exclude one of the candidate sets in the unique pair.

In some embodiments, each candidate set in the first plurality of candidate sets has an order that causes the one or more filters present in any candidate set to be placed last.

In some embodiments, the one or more tags, the one or more log sources, the one or more selections, and the one or more filters in the first candidate set are in any order.

In some embodiments, the one or more non-transitory computer-readable storage media comprising instructions when executed further cause the one or more processors to preprocess the first plurality of sigma rules into a normalized form.

In some embodiments, the machine learning algorithm is a TRIE algorithm or recurrent neural network.

In some embodiments, the second plurality of candidate sets is input to training the machine learning algorithm.

In some embodiments, the one or more rules in the first plurality of sigma rules further comprises a condition, and wherein creating all possible combinations to include in the first plurality of candidate sets from the respective one or more rules further comprises creating a candidate set for each operator in a Boolean conditional statement in the respective condition, applying some filters according to the condition, or any combination thereof.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIG. 1 is a flow diagram of a method for automated filter determination for sigma rules used in a malicious content detection system, according to some embodiments of the invention.

Figure 2:
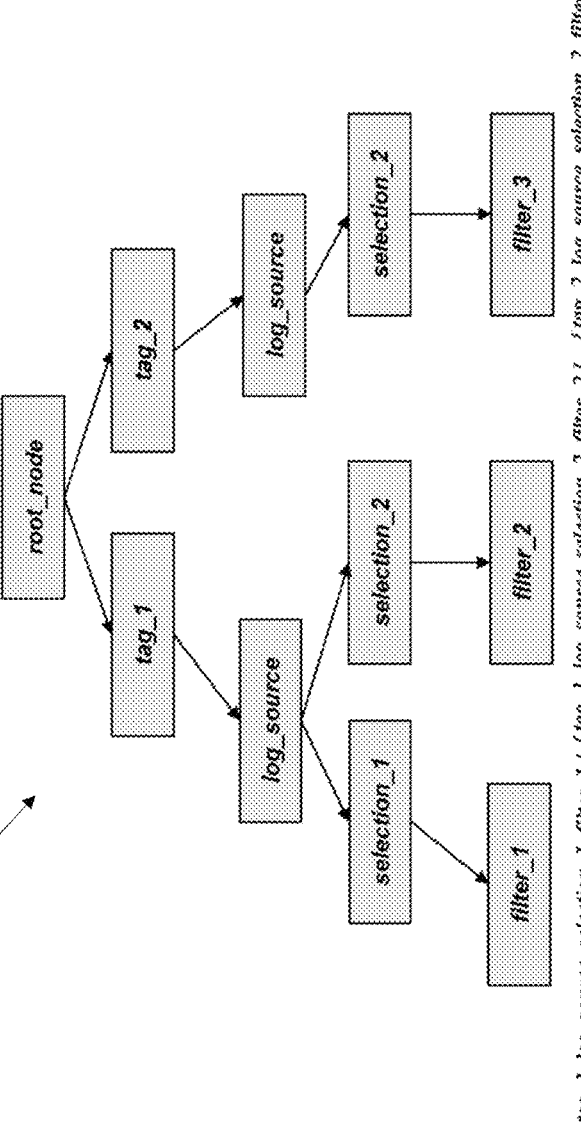
FIG. 2 is diagram of a data structure 200 created by a modified TRIE algorithm for a sigma rule, according to some embodiments of the invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the invention can be practiced without these specific details. In other instances, well-known methods, procedures, and components, modules, units and/or circuits have not been described in detail so as not to obscure the invention.

FIG. 1 is a flow diagram of a method for automated filter determination for sigma rules used in a malicious content detection system, according to some embodiments of the invention.

The method can involve receiving (e.g., by a computing device 500 as described below in FIG. 5) a first plurality of sigma rules (Step 110). Sigma rules can be written in a YAML format. Each sigma rule can include a plurality of sections. The plurality of sections can include metadata, tags, log sources, detection/selection, and/or filters.

The metadata section can include metadata related to the particular sigma rule including, for example, title, identification, description, reference, author, date and/or any metadata field as is described in the sigma rules specification.

The tags section can include attack modes, categorization of the rules, and/or any tag as is described in the sigma rules specification.

The log source section can describe the kind of data source of sigma rule applied against.

The detection/selection section can include selection section, filter section and/or condition section. The selection section can include activity captured in a log file against which a malicious content alert is to be generated. The condition section can include logical expression of how the selection and/or filters can be applied.

The filter section can identify content that was erroneously identified as falsely malicious.

Each sigma rule in the first plurality of sigma rules can include at least one or more tags, one or more log sources and/or one or more selections. At least some of the sigma rules in the first plurality of sigma rules can include one or more filters.

The method can involve for each rule in the first plurality of sigma rules, determining (e.g., by a computing device 500 as described below in FIG. 5) a first plurality of candidate sets by sampling the one or more tags, the one or more log sources the one or more selections, and the one or more filters when present in the respective rule to create all possible combinations to include in the first plurality of candidate sets from the respective rule (Step 120). In some embodiments, one tag and one log source are sampled.

The first plurality of sigma rules can be training data for training a machine learning algorithm for an inference stage (e.g., determining a filter from sigma rules) as discussed in further detail below.

As described above, a sigma rule can have various sections. Some sections can have multiple fields some sections can have one field. Some fields have multiple values; some fields have a singular value. Each candidate set can be a unique combination of the tag, log sources, selections and filters available in the rule. In various embodiments, each rules candidate set has one of a plurality of candidate sets.

For example, assume a rule with two tags, $t_1$, $t_2$, a log source with one log source defined, $l_1$, a selection with one selection, $s_1$, and a filter with two filters, $f_1$, $f_2$. The candidate set in this example is: $\{t_1,l_1,s_1,f_1\}$; $\{t_2,l_1, s_1,f_1\}$; $\{t_1,l_1,s_1,f_2\}$; $\{t_2,l_1,s_1,f_2\}$; $\{t_1,t_2,l_1,s_1,f_1\}$; $\{t_1,t_2,l_1,s_1,f_2\}$; $\{t_1,t_2,l_1,s_1,f_1,f_2\}$.

In some embodiments, the candidate set can be generated with the fields in any order. In some embodiments, the candidate set is generated with the filter field in the last position.

Table 1 as shown below is an example of a sigma rule according to some embodiments of the invention.

TABLE 1

```
title: PowerShell Downgrade Attack - PowerShell
id: 6331d09b-4785-4c13-980f-f96661356249
status: test
description: Detects PowerShell downgrade attack by comparing the host versions with
the
actual used engine version 2.0
references:
    http://www.leeholmes.com/blog/2017/03/17/detecting-and-preventing-powershell-
    downgrade-attacks/
author: Florian Roth (Nextron Systems), Lee Holmes (idea), Harish Segar (improve-
ments)
date: 2017/03/22
modified: 2023/10/27
tags:
    attack.defense_evasion
    attack.execution
    attack.t1059.001
logsource:
    product: windows
    category: ps_classic_start
detection:
    selection:
        Data|contains: 'Engine Version=2.'
    filter_main:
        Data|contains: 'HostVersion=2'
    Condition: selection and not filter_main
Falsepositives:
    unknown
```

An example candidates in a candidate set for the example sigma rule shown in Table 1 can be as shown in Table 2.

TABLE 2

```
{Tags, Log_source, Selection, Filters}
a. 'attack.defense_evasion', 'windows_ ps_classic_start', 'Engine
Version=2',
    'Host Version=2'
b. 'attack.execution', 'windows_ ps_classic_start', 'Engine Version=2',
    'Host Version=2'
```

TABLE 2-continued

```
c. 'attack.t1059.001', windows_ ps_classic_start', 'Engine Version=2',
    'Host Version=2'
```

The candidate set can be the smallest granular patterns within a sigma rule that describes potentially malicious activity, and the candidate sets can be the smallest granular patterns within a sigma rule that describes a problem statement and corresponding false positive scenario.

The method can also involve training (e.g., by a computing device 500 as described below in FIG. 5) a machine learning algorithm based on all of the first plurality of candidate sets determined for all of the first plurality of sigma rules (Step 130). The machine learning algorithm can be a TRIE algorithm (e.g., as is known in the art). As is known in the art, the TRIE algorithm typically creates a data structure with an alphabet letter or a substring of a word for each node. The TRIE algorithm can be modified such that each element in a candidate set is a node for the data structure.

Turning to FIG. 2, FIG. 2 is diagram of a data structure 200 created by a modified TRIE algorithm for a sigma rule, according to some embodiments of the invention. The TRIE algorithm can be modified as the inputs and are whole words rather than individual letters. In FIG. 2, the first plurality of sigma rules is simply one sigma rule that includes two tags, a log source, two selections and three filters, and examples of the first plurality of candidate sets determined from the sigma rule are {tag_1, log_source, selection_1, filter_1}; {tag_1, log_source, selection_2, filter_2}; {tag_2, log_source, selection_2, filter_3}. In some embodiments, the first plurality of candidate sets can include all of the permutations. The first plurality of candidate sets can be input to a TRIE algorithm and produce the data structure 200 as shown in FIG. 2. As is known in the art, the root node can be a dummy node which can serve as a starting point for a TRIE algorithm.

In some embodiments, the machine learning algorithm can be a recurrent neural network (RNN). In this embodiment, the candidate sets can be treated as sequence data. The RNN can receive the problem (e.g., tags, log sources, and/or selections). Each can be input to the RNN individually with a corresponding time tag. The RNN can generate a context vector that summarizes the candidate set numerically. The RNN can receive as input a candidate set and create the context vector (e.g., a numerical vector/embedding vector). The numerical vector/embedding vector can be a summarized numerical version of the candidate set. During a training phase, the context vector can be input into a neuron with an activation function and the activation function can output a likelihood of filters. The likelihood can be matched with actual filter values and a difference/error can be back propagated through the RNN. The RNN weights can be adjusted accordingly. During an inference phase, the candidate set can be passed through the trained RNN. A filter with the highest probability can be used as a recommendation for the candidate set.

The training can be performed in real-time. For example a Trie algorithm can be updated in real-time whenever a correct recommendation is made. In another example, an RNN can be trained in real-time with new updated training data.

combination thereof). The sigma rules can be input to the sigma rules repository 305 to the custom parser module 310.

The custom parser module 310 can parse the sigma rules to only include tags, log source, selection filters and/or conditions for each rule. For example, using the sigma rule in Table 2, the custom parser module 310 can parse such that there is a tag set: attack.defense_evasion; "attack.execution; attack.t1059.001; logsource set: windows; ps_classic_start; selection set: EnginerVersion=2; filter set: HostVersion=2; and condition: selection and not filter_main.

In various embodiments, instead of a custom parser, a deep learning module or natural language programming (NLP) can be used to pare the sigma rules.

The parsed sigma rules can be input to a candidate set generation module 312. The candidate set generation module 312 can receive the output of the custom parser module 310. The candidate set generation module 312 can generate all of the permutations of candidates 315 from the parsed sigma rules. For example, following with the example above, all permutations can be as shown below in Table 3:

TABLE 3

| | Tag | LogSource | Selection | Filter | Condition |
|---|---|---|---|---|---|
| 1 | attack.defense_evasion | Windows | EngineVersion = 2 | HostVersion = 2 | Selection and not filter_main |
| 2 | attack.defense_evasion | Ps_classic_Start | EngineVersion = 2 | HostVersion = 2 | Selection and not filter_main |
| 3 | attack.execution | Windows | EngineVersion = 2 | HostVersion = 2 | Selection and not filter_main |
| 4 | attack.execution | Ps_classic_Start | EngineVersion = 2 | HostVersion = 2 | Selection and not filter_main |
| 5 | attack.t1059.001 | Windows | EngineVersion = 2 | HostVersion = 2 | Selection and not filter_main |
| 6 | attack.t1059.001 | Ps_classic_Start | EngineVersion = 2 | HostVersion = 2 | Selection and not filter_main |

Figure 3:
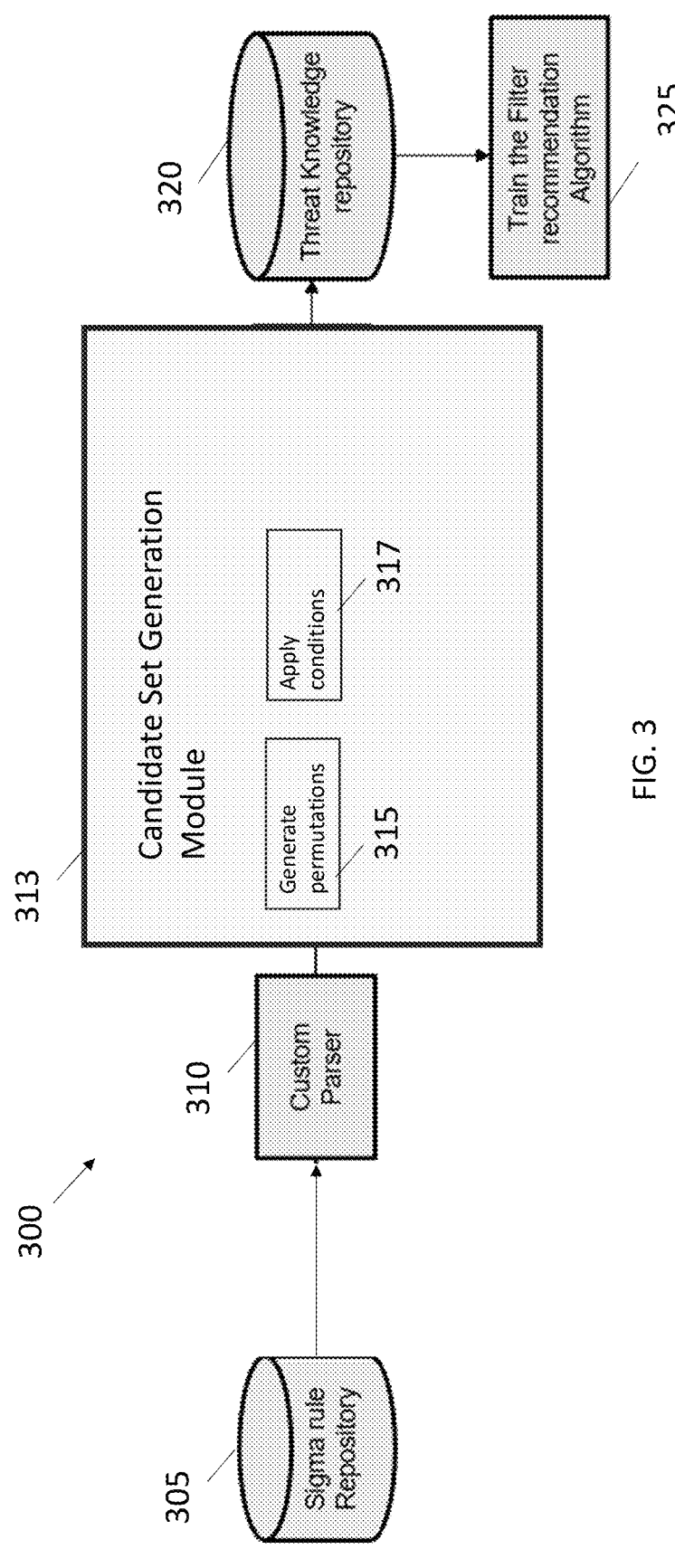
FIG. 3 is a diagram of a real-time training phase architecture for training a machine learning algorithm based on a first plurality of candidate sets determined for a first plurality of sigma rules, according to some embodiments of the invention.

Turning to FIG. 3, FIG. 3 is a diagram of a real-time training phase architecture 300 for training a machine learning algorithm based on a first plurality of candidate sets determined for a first plurality of sigma rules, according to All of the permutations can have the conditions applied 317. For example, continuing with the example of Table 3, applying conditions Selection and not filter_main to Table 3 can result in a candidate set as follows:

```
['attack.defense_evasion', 'windows_ ps_classic_start', 'Engine Version=2',
'HostVersion=2']
['attack.execution', 'windows_ ps_classic_start', 'EngineVersion=2', 'HostVersion=2']
['attack.t1059.001', windows_ ps_classic_start', 'Engine Version=2', 'Host Version=2']
['attack.defense_evasion', 'windows', 'EngineVersion=2', 'HostVersion=2']
['attack.execution', 'windows', 'Engine Version=2', 'HostVersion=2']
['attack.t1059.001', 'windows', 'EngineVersion=2', 'HostVersion=2']
['attack.defense_evasion', 'ps_classic_start', 'Engine Version=2', 'HostVersion=2']
['attack.execution', 'ps_classic_start', 'Engine Version=2', 'HostVersion=2']
['attack.t1059.001', 'ps_classic_start', 'Engine Version=2', 'HostVersion=2']
``` some embodiments of the invention. The real-time training phase architecture 300 includes a sigma rule repository 305, a custom parser module 310, candidate set generation module 313, a threat knowledge repository 320, and a machine learning algorithm training module 325.

The sigma rule repository 305 can store sigma rules. The sigma rules can be input by a user (e.g., an organization that has a set of sigma rules, an open source repository or any In some embodiments contents in the Logsource can be combined, as in Table 2 each sigma rule has only one Logsource. The product and category subsections within the sigma rule can be combined, as there can be only one Logsource product as windows.

The candidate sets are input to the threat knowledge repository 320 to store the candidate sets, and input to the machine learning algorithm training module 325 to train a machine learning algorithm (e.g., as described in FIG. 2).

In some embodiments, each candidate set is compared for similarity to other candidate sets in the threat knowledge repository 320. The similarity can be determined by determining a similarity score. The similarity score can be a pairwise Jaccard index score, as shown below in EQN. 1:

$$J_{score}(\text{Sigma\_rule}_a, \text{Sigma\_rule}_b) = \frac{|\text{candidate sets sigma\_rule}_a \cap \text{candidate sets sigma\_rule}_b|}{|\text{candidate sets sigma\_rule}_a \cup \text{candidate sets sigma\_rule}_b|} \quad \text{EQN. 1}$$

where candidate sets sigma_rule$_a$ is a collection of all the candidate sets from sigma_rule$_a$; and candidate sets sigma_rule$_b$ is a collection of all the candidate sets from sigma_rule$_b$.

In some embodiments, if the similarity score is greater than a threshold, excluding one of the candidate sets in the unique pair, the threshold can be predetermined (e.g., input by a user, set as a default value).

In this manner, redundant candidate sets can be removed, such that an amount of storage to store the sigma rules can be reduced in comparison to storing the sigma rules. Removing redundant candidate sets can also allow for faster access of relevant data due to, for example, a smaller volume of data.

The sigma rule repository 305 and/or the threat knowledge repository 320 can be a database. The threat knowledge repository 320 can map each sigma rule to their corresponding candidates.

The custom parser module 310, the candidate set generation module 313, the generate candidate sets module 315, the threat knowledge repository 320, and/or the machine learning algorithm training module 325 can be implemented on a single server, each on its own server, or any on any combination of servers.

Turning back to FIG. 1, the method can also involve receiving (e.g by a computing device 500 as described below in FIG. 5) a second plurality of sigma rules, each sigma rule in the second plurality of signal rules comprising at least one or more tags, one or more log sources and one or more selections. The second plurality of sigma rules can be input by a user.

The method can also involve for each rule in the second plurality of sigma rules (e.g., by a computing device 500 as described below in FIG. 5) determining a second plurality of candidate sets by sampling the one or more tags, the one or more log sources and the one or more selections to create all possible combinations to include in the second plurality of candidate sets from the respective rule. The candidate sets can be determined by creating the unique combination permutations of the tags, log sources, and/or selections as described above in Step 150.

The method can also involve determining (e.g., by a computing device 500 as described below in FIG. 5) one or more filters for each sigma rule in the second plurality of sigma rules by using all of the second plurality of candidate sets determined for all of the second plurality of sigma rules as input to the trained machine learning algorithm (e.g., trained machine learning algorithm as described above in FIG. 2).

The method can also involve setting (e.g., by a computing device 500 as described below in FIG. 5) the second plurality of sigma rules with the one or more determined filters in the rule as the sigma rules for the malicious content detection system.

Figure 4:
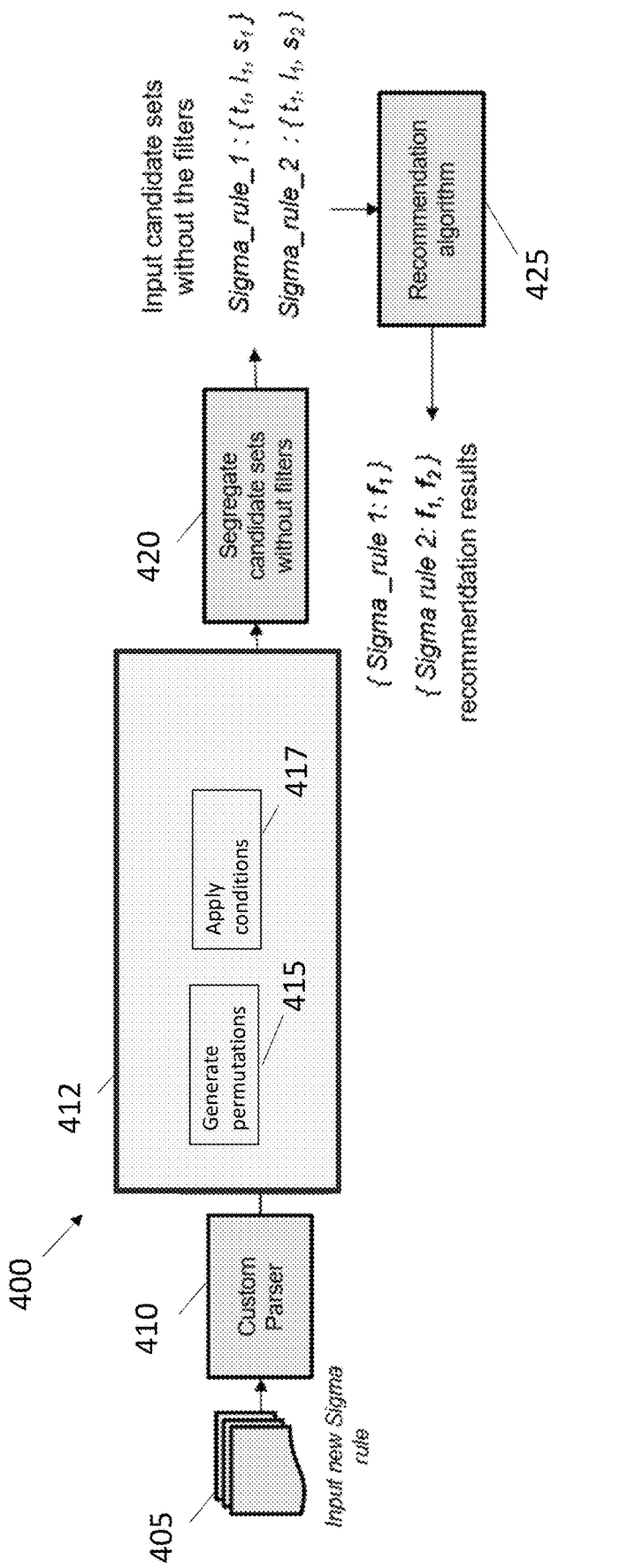
FIG. 4 is a diagram of a real-time inference phase architecture for determining one or more filters for a second plurality of candidate sets determined for a first plurality of sigma rules, according to some embodiments of the invention.

Turning to FIG. 4, FIG. 4 is a diagram of a real-time inference phase architecture 400 for determining one or more filters for a second plurality of candidate sets determined for a first plurality of sigma rules, according to some embodiments of the invention.

The real-time inference phase architecture 400 includes a custom parser module 410, a candidate set generation module 412, a segregate candidate module 420, and a trained machine learning algorithm module 425.

The second plurality of sigma rules 405 is input to the custom parser module 410. The custom parser module 410 can be the same as the custom parser module 310 as described above in FIG. 3. The custom parser module 410 can parse the second plurality of sigma rules. The parsed second plurality of sigma rules can be input to the candidate set generation module 412 (e.g., candidate set generation module 313 as described above in FIG. 3).

The candidate set generation module 412 can output the candidate sets and the segregate candidate module 420 can segregate the candidate sets to determine which candidate sets are desirable to have more filters applied to them, for example, a candidate set without any filters or a candidate set that has filters but to which additional filters can apply to. The segregated candidate sets are input to the trained machine learning algorithm module 425 (e.g., trained as described above in FIG. 3). The trained machine learning algorithm module 425 can recommend the filter to apply to each candidate set based on the trained machine learning algorithm 425.

The second plurality of candidate sets can be used to retrain the machine learning algorithm module 425 in real time in embodiments where the machine learning algorithm is a RNN.

Figure 5:
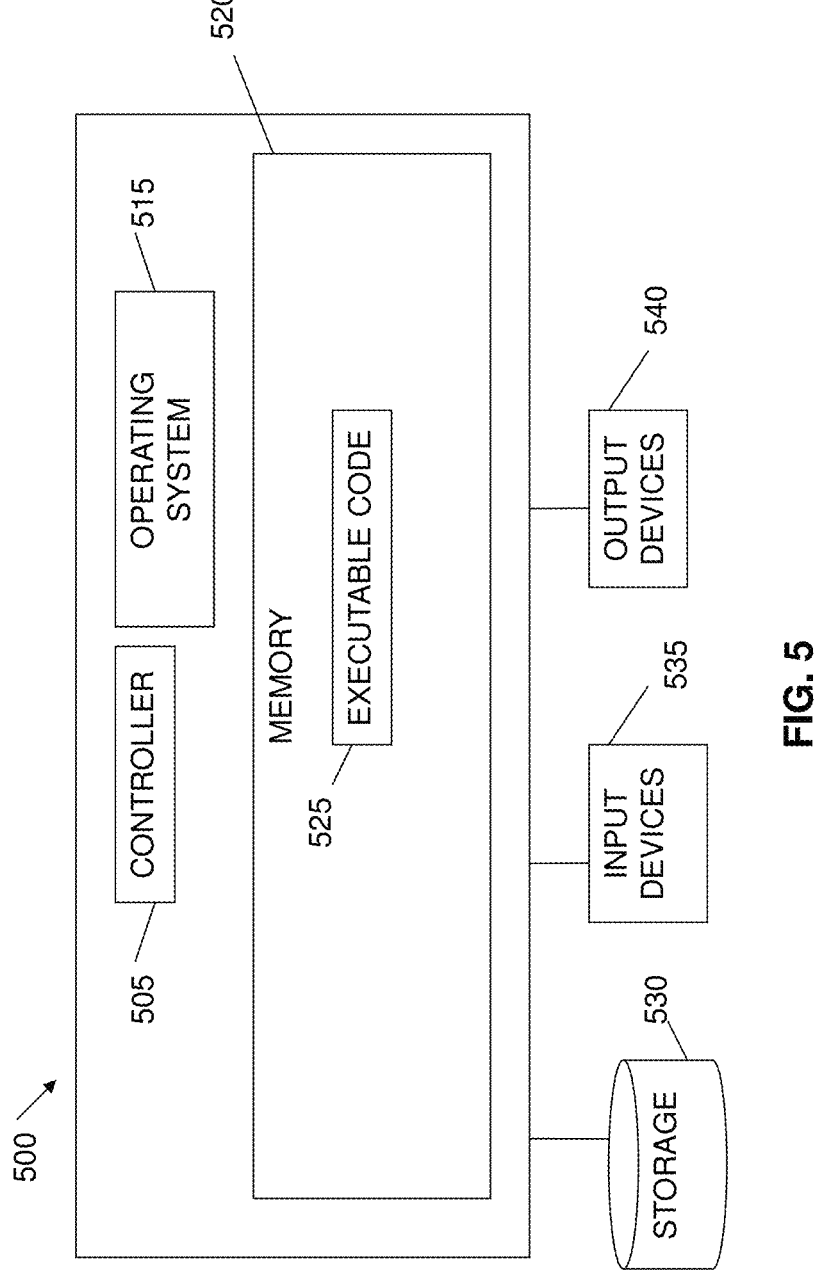
FIG. 5 shows a block diagram of a computing device which can be used with embodiments of the invention.

FIG. 5 shows a block diagram of a computing device 500 which can be used with embodiments of the invention. Computing device 500 can include a controller or processor 505 that can be or include, for example, one or more central processing unit processor(s) (CPU), one or more Graphics Processing Unit(s) (GPU or GPGPU), a chip or any suitable computing or computational device, an operating system 515, a memory 520, a storage 530, input devices 535 and output devices 540.

Operating system 515 can be or can include any code segment designed and/or configured to perform tasks involving coordination, scheduling, arbitration, supervising, controlling or otherwise managing operation of computing device 500, for example, scheduling execution of programs. Memory 520 can be or can include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 520 can be or can include a plurality of possibly different memory units. Memory 520 can store for example, instructions to carry out a method (e.g. code 525), and/or data such as user responses, interruptions, etc.

Executable code 525 can be any executable code, e.g., an application, a program, a process, task or script. Executable code 525 can be executed by controller 505 possibly under control of operating system 515. For example, executable code 525 can when executed cause masking of personally identifiable information (PII), according to embodiments of the invention. In some embodiments, more than one computing device 500 or components of device 500 can be used for multiple functions described herein. For the various modules and functions described herein, one or more computing devices 500 or components of computing device 500 can be used. Devices that include components similar or different to those included in computing device 500 can be used, and can be connected to a network and used as a system. One or more processor(s) 505 can be configured to carry out embodiments of the invention by for example executing software or code. Storage 530 can be or can include, for example, a hard disk drive, a floppy disk drive, a Compact Disk (CD) drive, a CD-Recordable (CD-R) drive, a universal serial bus (USB) device or other suitable removable and/or fixed storage unit. Data such as instructions, code, NN model data, parameters, etc. can be stored in a storage 530 and can be loaded from storage 530 into a memory 520 where it can be processed by controller 505. In some embodiments, some of the components shown in FIG. 5 can be omitted.

Input devices 535 can be or can include for example a mouse, a keyboard, a touch screen or pad or any suitable input device. It will be recognized that any suitable number of input devices can be operatively connected to computing device 500 as shown by block 535. Output devices 540 can include one or more displays, speakers and/or any other suitable output devices. It will be recognized that any suitable number of output devices can be operatively connected to computing device 500 as shown by block 540. Any applicable input/output (I/O) devices can be connected to computing device 500, for example, a wired or wireless network interface card (NIC), a modem, printer or facsimile machine, a universal serial bus (USB) device or external hard drive can be included in input devices 535 and/or output devices 540.

Embodiments of the invention can include one or more article(s) (e.g. memory 520 or storage 530) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

One skilled in the art will realize the invention can be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by an apparatus and can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device, a transmitting device, and/or a computing device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input. The computing device can include, for example, a computer, a computer with a browser device, a telephone, an IP phone, a mobile device (e.g., cellular phone, personal digital assistant (PDA) device, laptop computer, electronic mail device), and/or other communication devices. The computing device can be, for example, one or more computer servers. The computer servers can be, for example, part of a server farm. The browser device includes, for example, a computer (e.g., desktop computer, laptop computer, and tablet) with a World Wide Web browser (e.g., Microsoft® Internet Explorer® available from Microsoft Corporation, Chrome available from Google, Mozilla® Firefox available from Mozilla Corporation, Safari available from Apple). The mobile computing device includes, for example, a personal digital assistant (PDA).

Website and/or web pages can be provided, for example, through a network (e.g., Internet) using a web server. The web server can be, for example, a computer with a server module (e.g., Microsoft® Internet Information Services available from Microsoft Corporation, Apache Web Server available from Apache Software Foundation, Apache Tomcat Web Server available from Apache Software Foundation).

The storage module can be, for example, a random access memory (RAM) module, a read only memory (ROM) module, a computer hard drive, a memory card (e.g., universal serial bus (USB) flash drive, a secure digital (SD) flash card), a floppy disk, and/or any other data storage device. Information stored on a storage module can be maintained, for example, in a database (e.g., relational database system, flat database system) and/or any other logical information storage mechanism.

The above-described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

The above described networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN), a private IP network, an IP private branch exchange (IPBX), a wireless network (e.g., radio access network (RAN)), 802.11 network, 802.16 network, general packet radio service (GPRS) network, Hiper-LAN), and/or other packet-based networks. Circuit-based networks can include, for example, the public switched telephone network (PSTN), a private branch exchange (PBX), a wireless network (e.g., RAN, Bluetooth®, code-division multiple access (CDMA) network, time division multiple access (TDMA) network, global system for mobile communications (GSM) network), and/or other circuit-based networks.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with embodiments. In some embodiments the instructions stored on the computer readable medium may be in the form of an installed application and in the form of an installation package.

Such instructions may be, for example, loaded by one or more processors and executed. For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

What is claimed is:

1. A computerized method for automated filter determination for sigma rules used in a malicious content detection system, the computerized method comprising:

receiving, by a computing device, a first plurality of sigma rules, each sigma rule in the first plurality of signal rules comprising at least one or more first tags, one or more first log sources and one or more first selections, and wherein at least some of the sigma rules in the first plurality of sigma rules comprise one or more first filters;

for each rule in the first plurality of sigma rules, determining, by the computing device, a first plurality of candidate sets by sampling the one or more first tags, the one or more first log sources, the one or more first selections, and the one or more first filters when present in the respective rule to create all possible combinations to include in the first plurality of candidate sets from the respective rule;

training, by the computing device, a machine learning algorithm based on all of the first plurality of candidate sets determined for all of the first plurality of sigma rules;

receiving, by the computing device, a second plurality of sigma rules, each sigma rule in the second plurality of signal rules comprising at least one or more second tags, one or more second log sources and one or more second selections;

for each rule in the second plurality of sigma rules, determining, by the computing device, a second plurality of candidate sets by sampling the one or more second tags, the one or more second log sources, the one or more second selections to create all possible combinations to include in the second plurality of candidate sets from the respective rule;

determining, by the computing device, one or more filters for each sigma rule in the second plurality of sigma rules by using all of the second plurality of candidate sets determined for all of the second plurality of sigma rules as input to the trained machine learning algorithm; and setting, by the computing device, the second plurality of sigma rules with the one or more determined filters in the rule as the sigma rules for the malicious content detection system.

2. The computerized method of claim 1 further comprising:

determining, by the computing device, a similarity score between each unique pair of candidate sets in the second plurality of candidate sets; and for each unique pair having a similarity score greater than a predetermined threshold, excluding one of the candidate sets in the unique pair.

3. The computerized method of claim 1 wherein each candidate set in the first plurality of candidate sets has an order that causes the one or more filters present in any candidate set to be placed last.

4. The computerized method of claim 1 wherein the one or more first tags, the one or more first log sources the one or more first selections, and the one or more first filters in the first plurality of candidate sets are in any order.

5. The computerized method of claim 1 further comprising:

preprocessing, by the computing device, the first plurality of sigma rules into a normalized form.

6. The computerized method of claim 1 wherein the machine learning algorithm is a TRIE algorithm or recurrent neural network.

7. The computerized method of claim 1 wherein the second plurality of candidate sets is input to training the machine learning algorithm.

8. The computerized method of claim 1 wherein one or more rules in the first plurality of sigma rules further comprises a condition, and wherein creating all possible combinations to include in the first plurality of candidate sets from the respective one or more rules further comprises, creating a candidate set for each operator in a Boolean conditional statement in the respective condition, applying some filters according to the condition, or any combination thereof.

9. One or more non-transitory computer-readable storage media comprising instructions that are executable to cause one or more processors to:

receive a first plurality of sigma rules, each sigma rule in the first plurality of signal rules comprising at least one or more first tags, one or more first log sources and one or more first selections, and wherein at least some of the sigma rules in the first plurality of sigma rules comprise one or more first filters;

for each rule in the first plurality of sigma rules, determine a first plurality of candidate sets by sampling the one or more first tags, the one or more first log sources, the one or more first selections, and the one or more first filters when present in the respective rule to create all possible combinations to include in the first plurality of candidate sets from the respective rule;

train a machine learning algorithm based on all of the first plurality of candidate sets determined for all of the first plurality of sigma rules;

receive a second plurality of sigma rules, each sigma rule in the second plurality of signal rules comprising at least one or more second tags, one or more second log sources and one or more second selections;

for each rule in the second plurality of sigma rules, determine a second plurality of candidate sets by sampling the one or more second tags, the one or more second log sources, the one or more second selections to create all possible combinations to include in the second plurality of candidate sets from the respective rule;

determine one or more filters for each sigma rule in the second plurality of sigma rules by using all of the second plurality of candidate sets determined for all of the second plurality of sigma rules as input to the trained machine learning algorithm; and set the second plurality of sigma rules with the one or more determined filters in the rule as chosen sigma rules for a malicious content detection system.

10. The one or more non-transitory computer-readable storage media of claim 9 wherein the one or more processors are further caused to:

determine a similarity score between each unique pair of candidate sets in the second plurality of candidate sets; and for each unique pair having a similarity score greater than a predetermined threshold, exclude one of the candidate sets in the unique pair.

11. The one or more non-transitory computer-readable storage media of claim 9 wherein each candidate set in the first plurality of candidate sets has an order that causes the one or more filters present in any candidate set to be placed last.

12. The one or more non-transitory computer-readable storage media of claim 9 wherein the one or more first tags, the one or more first log sources the one or more first selections, and the one or more first filters in the first plurality of candidate sets are in any order.

13. The one or more non-transitory computer-readable storage media of claim 9 wherein the one or more processors are further caused to:

preprocess the first plurality of sigma rules into a normalized form.

14. The one or more non-transitory computer-readable storage media of claim 9 wherein the machine learning algorithm is a TRIE algorithm or recurrent neural network.

15. The one or more non-transitory computer-readable storage media of claim 9 wherein the second plurality of candidate sets is input to training the machine learning algorithm.

16. The one or more non-transitory computer-readable storage media of claim 9 wherein one or more rules in the first plurality of sigma rules further comprises a condition, and wherein creating all possible combinations to include in the first plurality of candidate sets from the respective one or more rules further comprises, creating a candidate set for each operator in a Boolean conditional statement in the respective condition, applying some filters according to the condition, or any combination thereof.

*  *  *  *  *